United States Patent
Townsend et al.

(10) Patent No.: US 10,919,014 B2
(45) Date of Patent: Feb. 16, 2021

(54) HIGH-LOAD VACUUM CHAMBER MOTION FEEDTHROUGH SYSTEMS AND METHODS

(71) Applicant: Craig Technical Consulting, Inc., Merritt Island, FL (US)

(72) Inventors: Ivan Townsend, Kennedy Space Center, FL (US); Jason Schuler, Kennedy Space Center, FL (US); Robert Cox, Kennedy Space Center, FL (US)

(73) Assignee: Craig Technical Consulting, Inc., Merritt Island, FL (US)

( * ) Notice: Subject to any disclaimer, the term of this patent is extended or adjusted under 35 U.S.C. 154(b) by 35 days.

(21) Appl. No.: 16/378,042

(22) Filed: Apr. 8, 2019

(65) Prior Publication Data

US 2019/0308152 A1  Oct. 10, 2019

Related U.S. Application Data

(60) Provisional application No. 62/654,971, filed on Apr. 9, 2018.

(51) Int. Cl.
*B01J 3/00* (2006.01)

(52) U.S. Cl.
CPC .................... *B01J 3/006* (2013.01)

(58) Field of Classification Search
CPC ....... F26B 5/00; F26B 5/06; B01J 3/00; B01J 3/006
USPC .............................................. 34/92
See application file for complete search history.

(56) References Cited

U.S. PATENT DOCUMENTS

| | | | | | |
|---|---|---|---|---|---|
| 3,486,663 | A | * | 12/1969 | Humphrey | B05B 11/3032 222/207 |
| 3,635,607 | A | * | 1/1972 | Grise | F04B 43/0063 417/394 |
| 4,278,114 | A | * | 7/1981 | Ruberg | A23L 3/0155 137/565.25 |
| 6,935,339 | B2 | * | 8/2005 | Mattar Neto | A61M 16/0463 128/207.16 |
| 8,186,976 | B2 | * | 5/2012 | Lund | F04B 23/04 417/523 |
| 9,790,933 | B2 | * | 10/2017 | Park | F04B 9/14 |
| 2011/0154879 | A1 | * | 6/2011 | Stoddard | B22D 2/005 73/1.02 |
| 2012/0313305 | A1 | * | 12/2012 | Knobloch | F16F 9/0209 267/126 |
| 2014/0058361 | A1 | * | 2/2014 | Gordon | A61M 1/0031 604/542 |

FOREIGN PATENT DOCUMENTS

| | | | | |
|---|---|---|---|---|
| JP | 6166774 B2 | * | 7/2017 | ............ F04B 37/16 |
| KR | 101144500 B1 | * | 5/2012 | ............ F04B 33/00 |
| WO | WO-2013137564 A1 | * | 9/2013 | ............ F04B 33/00 |

* cited by examiner

*Primary Examiner* — Stephen M Gravini
(74) *Attorney, Agent, or Firm* — Mark Malek; Kelly G. Swartz; Widerman Malek, PL

(57) ABSTRACT

A feedthrough for use in a vacuum chamber including a hollow tube, a first O-ring, and rod, and a vacuum fitting. The hollow tube having a first recess located along an entirety of an inner circumference. The first O-ring captured by the first recess. The rod carried by the hollow tube wherein an outer circumference of the rod is configured to contact an entirety of an inner circumference of the first O-ring. The vacuum fitting fixedly secured to the hollow tube.

10 Claims, 1 Drawing Sheet

HIGH-LOAD VACUUM CHAMBER MOTION FEEDTHROUGH SYSTEMS AND METHODS

RELATED APPLICATIONS

This application claims the benefit under 35 U.S.C. § 119(e) of U.S. Provisional Patent Application Ser. No. 62/654,971 titled HIGH-LOAD VACUUM CHAMBER MOTION FEEDTHROUGH SYSTEMS AND METHODS filed on Apr. 9, 2018, the entire content(s) of which is/are incorporated herein by reference.

GOVERNMENT INTEREST

The invention described herein was made in the performance of work under a NASA contract NNK11EA08C and by employees of the United States Government and is subject to the provisions of Public Law 96-517 (35 U.S.C. § 202) and may be manufactured and used by or for the Government for governmental purposes without the payment of any royalties thereon of therefore.

FIELD OF THE INVENTION

The present invention relates to high-load vacuum chamber motion feed through systems and methods and, more specifically, to manipulating items both rotationally and linearly within a vacuum chamber.

BACKGROUND

Vacuum chambers and feedthroughs are well known in the art. Traditional vacuum feedthroughs may allow a user to manipulate one or more items contained within the vacuum chamber. However, no known feedthrough provides for both linear and rotary manipulation of a device from outside the vacuum chamber while also providing a high load capacity. Therefore, a need exists for a low cost feedthrough device, which provides for both linear and rotary manipulation of a device within a vacuum chamber, which is not required to function at a high vacuum level.

SUMMARY OF THE INVENTION

With the above in mind, embodiments of the present invention are related to a motion feedthrough for use in a vacuum chamber. The motion feedthrough may include a hollow tube, a first O-ring, a rod, and a vacuum fitting. The hollow tube may have a first recess located along an entirety of an inner circumference. The first O-ring may be captured by the first recess. The rod may be carried by the hollow tube wherein an outer circumference of the rod is configured to contact an entirety of an inner circumference of the first O-ring. The vacuum fitting may be fixedly secured to the hollow tube.

The vacuum fitting may be welded to the hollow tube and may include a standard KF vacuum fitting.

The first O-ring may be or include a low abrasion O-ring.

In one embodiment, the vacuum chamber may include a second O-ring. The hollow tube may have a second recess along an entirety of its inner circumference, which may be configured to capture the second O-ring. The outer circumference of the rod may be configured to contact an entirety of an inner circumference of the second O-ring.

The second O-ring may be or include a low abrasion O-ring.

A cavity may be defined by the first O-ring, the second O-ring, an inner side of a side wall of the hollow tube, and an outer side of the rod.

The feedthrough may also include an aperture extending through an entirety of the side wall of the hollow tube at a portion of the side wall defining the cavity and a lubricant carried within that cavity.

A first end of the rod may be adapted to secure to an object located within the vacuum chamber.

A first end of the rod may be tapped.

One embodiment of the feedthrough may include a vacuum chamber adapted to carry the vacuum fitting with a first end of the rod located within the vacuum chamber and an opposing second end of the rod located outside of the vacuum chamber.

DETAILED DESCRIPTION OF THE INVENTION

Figure 1:
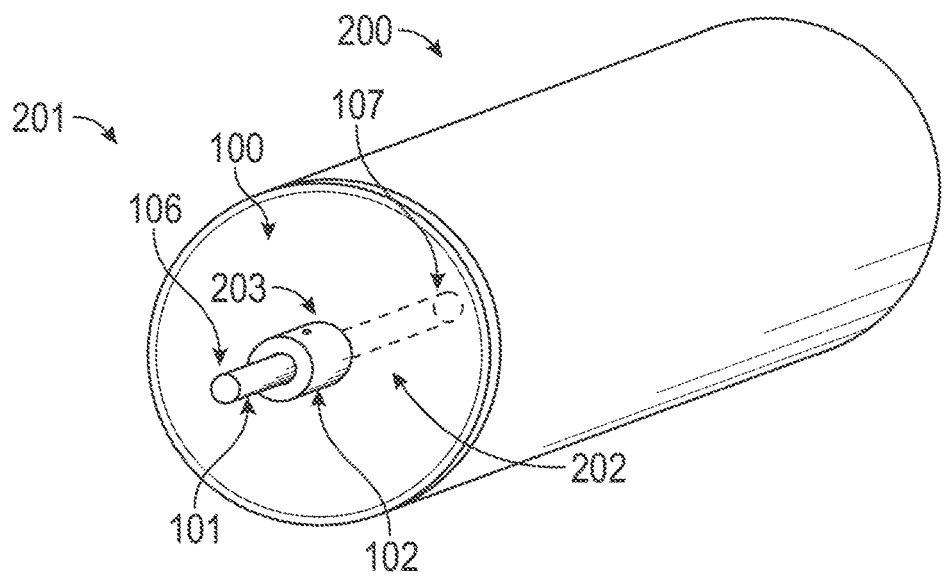
FIG. 1 is a perspective view of the motion feedthrough in combination with a vacuum chamber in accordance with an embodiment of the invention.
Figure 2:
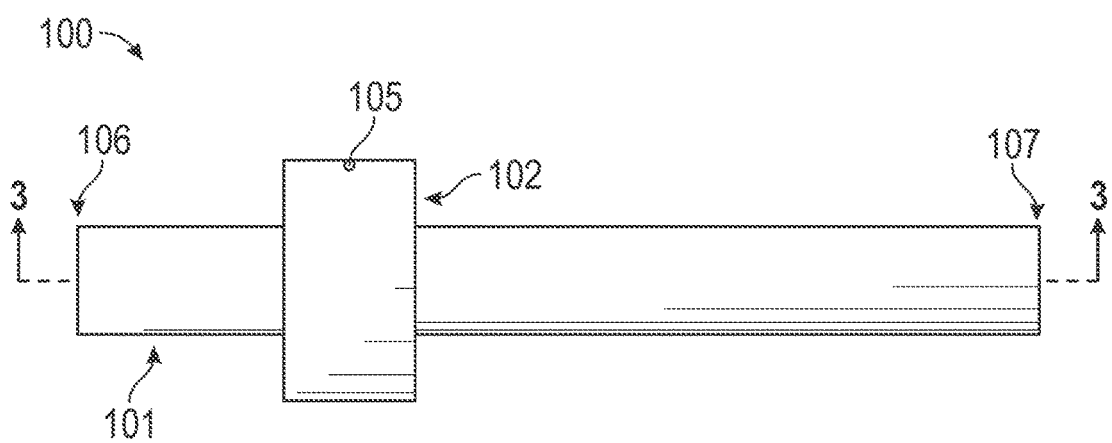
FIG. 2 is a side elevation view of the motion feedthrough of FIG. 1.
Figure 3:
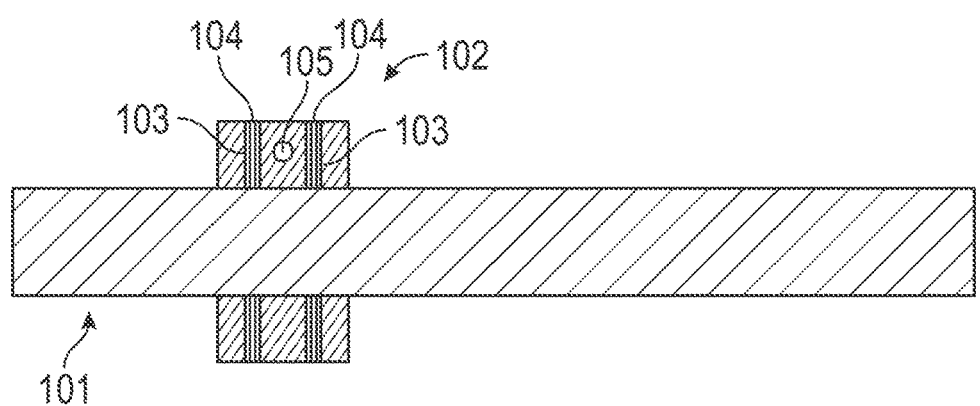
FIG. 3 is a cross-section view of the tube of the motion feedthrough taken through line 3-3 of FIG. 2.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a motion feedthrough 100 for a vacuum chamber 200. The motion feedthrough 100 may be configured to allow linear and rotary motion to be transmitted from the ambient side 201 to the vacuum side 202 of a vacuum chamber 200.

The inventive motion feedthrough 100 may include a steel rod 101, which may be hardened, ground, or polished stainless steel. The steel rod 101 may pass through a tube 102 welded to a vacuum fitting 203. The tube 102 may be stainless steel. The vacuum fitting 203 may be a standard KF vacuum fitting. The tube 102 may have one or more grooves 103 in its inner diameter. In one embodiment, there may be two grooves 103 in the inner diameter of the tube 102. Each of the grooves 103 may be adapted to carry an O-ring 104. The O-rings 104 may be low abrasion O-rings. The grooves 103 may be configured to position the O-rings 104 proximate to one another. In one embodiment, the O-rings 104 may create a cavity between them along an entirety of the perimeter of the O-rings 104 when positioned in the grooves 103. A grease port 105 may be tapped into the side wall of the tube 102.

The steel rod 101 may have a proximate end 106, which remains outside of the vacuum chamber 200, and a distal end, which may enter the vacuum chamber 200. Both or either of the proximate end 106 and the distal end 107 may be tapered or tapped. Either end 106, 107 may be tapered to allow for installation or the rod 101 through the tube 102. Either end 106, 107 may be tapped to allow the rod 101 to attach to various implements.

An O-ring 104 may be positioned in each of two grooves 103 in the inner diameter of the tube 102 and the cavity between the O-rings 104 may be filled with a lubricant, which may be, but is not limited to, grease. The lubricant may be introduced to the inner diameter of the tube 102 using the grease port 105, which may be located between two grooves 103.

Prior to operation of the motion feedthrough, the steel rod 101 may be inserted into the tube 102 and may be driven back and forth through the O-rings 104 carried by the tube 102 to ensure proper distribution of the lubricant along the steel rod 101 and to break the static friction between the steel rod 101 and the tube 102.

The distal end 107 of the steel rod 101 may be secured to an object within the vacuum chamber 200. The proximate end 106 of the steel rod 101 may be manipulated outside of the vacuum chamber 200 to allow linear and rotary motion of the object secured to the steel rod 101. The seal between the steel rod 101 and the tube 102 allows the object to be simultaneously moved linearly and rotationally.

The motion feedthrough 100 could be used by several industries employing vacuum chambers.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the description of the invention. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

That which is claimed is:

1. A feedthrough for use in a vacuum chamber comprising:
   a hollow tube having a first recess located along an entirety of an inner circumference;
   a first O-ring captured by the first recess;
   a rod carried by the hollow tube wherein an outer circumference of the rod is configured to contact an entirety of an inner circumference of the first O-ring;
   a vacuum fitting fixedly secured to the hollow tube; and
   a vacuum chamber adapted to carry the vacuum fitting with a first end of the rod located within the vacuum chamber and an opposing second end of the rod located outside of the vacuum chamber.

2. The feedthrough for use in a vacuum chamber according to claim 1 wherein the vacuum fitting is welded to the hollow tube.

3. The feedthrough for use in a vacuum chamber according to claim 1 wherein the first O-ring comprises a low abrasion O-ring.

4. The feedthrough for use in a vacuum chamber according to claim 1 further comprising:
   a second O-ring;
   wherein the hollow tube has a second recess along an entirety of the inner circumference configured to capture the second O-ring; and
   wherein the outer circumference of the rod is configured to contact an entirety of an inner circumference of the second O-ring.

5. The feedthrough for use in a vacuum chamber according to claim 4 further comprising a cavity defined by the first O-ring, the second O-ring, an inner side of a side wall of the hollow tube, and an outer side of the rod.

6. The feedthrough for use in a vacuum chamber according to claim 5 further comprising an aperture extending through an entirety of the side wall of the hollow tube at a portion of the side wall defining the cavity.

7. The feedthrough for use in a vacuum chamber according to claim 6 further comprising a lubricant carried within the cavity.

8. The feedthrough for use in a vacuum chamber according to claim 1 wherein a first end of the rod is adapted to secure to an object located within the vacuum chamber.

9. The feedthrough for use in a vacuum chamber according to claim 1 wherein a first end of the rod is tapped.

10. A feedthrough for use in a vacuum chamber comprising:
    a hollow tube having a first recess and a second recess located along an entirety of an inner circumference;

a first O-ring captured by the first recess;
a second O-ring captured by the second recess;
a rod carried by the hollow tube wherein an outer circumference of the rod is configured to contact an entirety of an inner circumference of the first O-ring and the second O-ring;
a cavity defined by the first O-ring, the second O-ring, an inner side of a side wall of the hollow tube, and an outer side of the rod;
an aperture extending through an entirety of the side wall of the hollow tube at a portion of the side wall defining the cavity;
a lubricant carried within the cavity; and
a vacuum fitting fixedly secured to the hollow tube.

\* \* \* \* \*